United States Patent
Raikin et al.

(10) Patent No.: US 8,516,201 B2
(45) Date of Patent: Aug. 20, 2013

(54) PROTECTING PRIVATE DATA FROM CACHE ATTACKS

(75) Inventors: Shlomo Raikin, Geva Carmel (IL); Shay Gueron, Haifa (IL); Gad Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 11/950,963

(22) Filed: Dec. 5, 2007

(65) Prior Publication Data

US 2008/0147992 A1 Jun. 19, 2008

Related U.S. Application Data

(60) Provisional application No. 60/873,063, filed on Dec. 5, 2006, provisional application No. 60/873,051, filed on Dec. 5, 2006.

(51) Int. Cl.
*G06F 12/00* (2006.01)
*G06F 12/06* (2006.01)

(52) U.S. Cl.
USPC .................. 711/146; 711/135; 711/163

(58) Field of Classification Search
USPC ............. 711/146, 152, 163, 135, E12.001
See application file for complete search history.

(56) References Cited

U.S. PATENT DOCUMENTS

| | | | | |
|---|---|---|---|---|
| 5,282,272 | A * | 1/1994 | Guy et al. | 710/116 |
| 6,529,968 | B1 * | 3/2003 | Anderson | 710/22 |
| 6,763,435 | B2 * | 7/2004 | Arimilli et al. | 711/146 |
| 7,302,528 | B2 * | 11/2007 | Cabot et al. | 711/138 |
| 7,584,330 | B2 * | 9/2009 | McKinney et al. | 711/146 |
| 2007/0180048 | A1 * | 8/2007 | Crick et al. | 709/217 |

* cited by examiner

*Primary Examiner* — Mardochee Chery
(74) *Attorney, Agent, or Firm* — Blakely, Sokoloff, Taylor & Zafman LLP

(57) ABSTRACT

A method and apparatus for protecting private data from cache attacks. One embodiment includes storing private data in a protected cache line to protect it from cache attacks. A snoop request may be received to the protected cache line. In response to the snoop request, a miss may be transmitted. Other embodiments are also disclosed and claimed.

13 Claims, 2 Drawing Sheets

METHOD 200

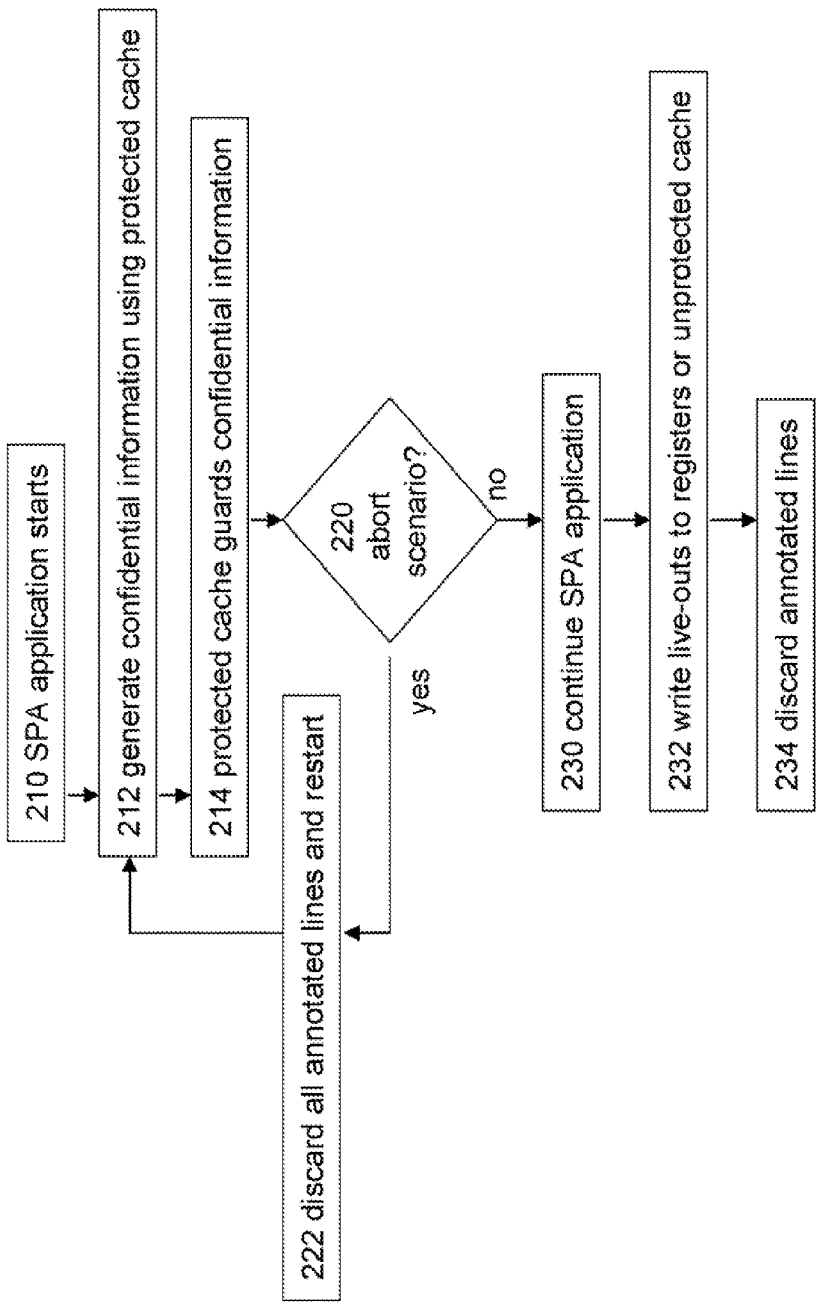

PROTECTING PRIVATE DATA FROM CACHE ATTACKS

REFERENCE TO PRIOR PROVISIONAL APPLICATION

This application claims the benefit of U.S. Provisional Application No. 60/873,063, filed Dec. 5, 2006, and U.S. Provisional Application No. 60/873,051, filed Dec. 5, 2006.

BACKGROUND

1. Field

The present invention relates generally to computer security and processor architecture and, more specifically, to protecting private data from cache attacks.

2. Description

Personal computer (PC) platforms are susceptible to various types of attacks that attempt, among other goals, to steal secrets, to illegitimately take control of the platform, illegitimately access protected/private areas of other processes, and to circumvent policy enforcement mechanisms. The increased value of content on the platform encourages sophisticated attacks on software and hardware, especially if the content falls under the "break once, run everywhere" (BORE) threat model.

Some viruses/malware can use holes in the operating system (OS) (sometimes even combined with physical tampering with the platform firmware to insert malicious code) to try access private data of other applications by bypassing the virtual address separation and address translation mappings enforced by the OS. Particularly dangerous are malicious applications that exploit security holes and access the memory space of other applications.

Enhanced protection against existing and potential attacks on the platform is an emerging requirement.

BRIEF DESCRIPTION OF THE DRAWINGS

The features and advantages of the present invention will become apparent from the following detailed description of the present invention in which:

FIG. 2 is a flow diagram of a method for protecting private data from cache attacks according to an embodiment of the present invention.

DETAILED DESCRIPTION

Figure 1:
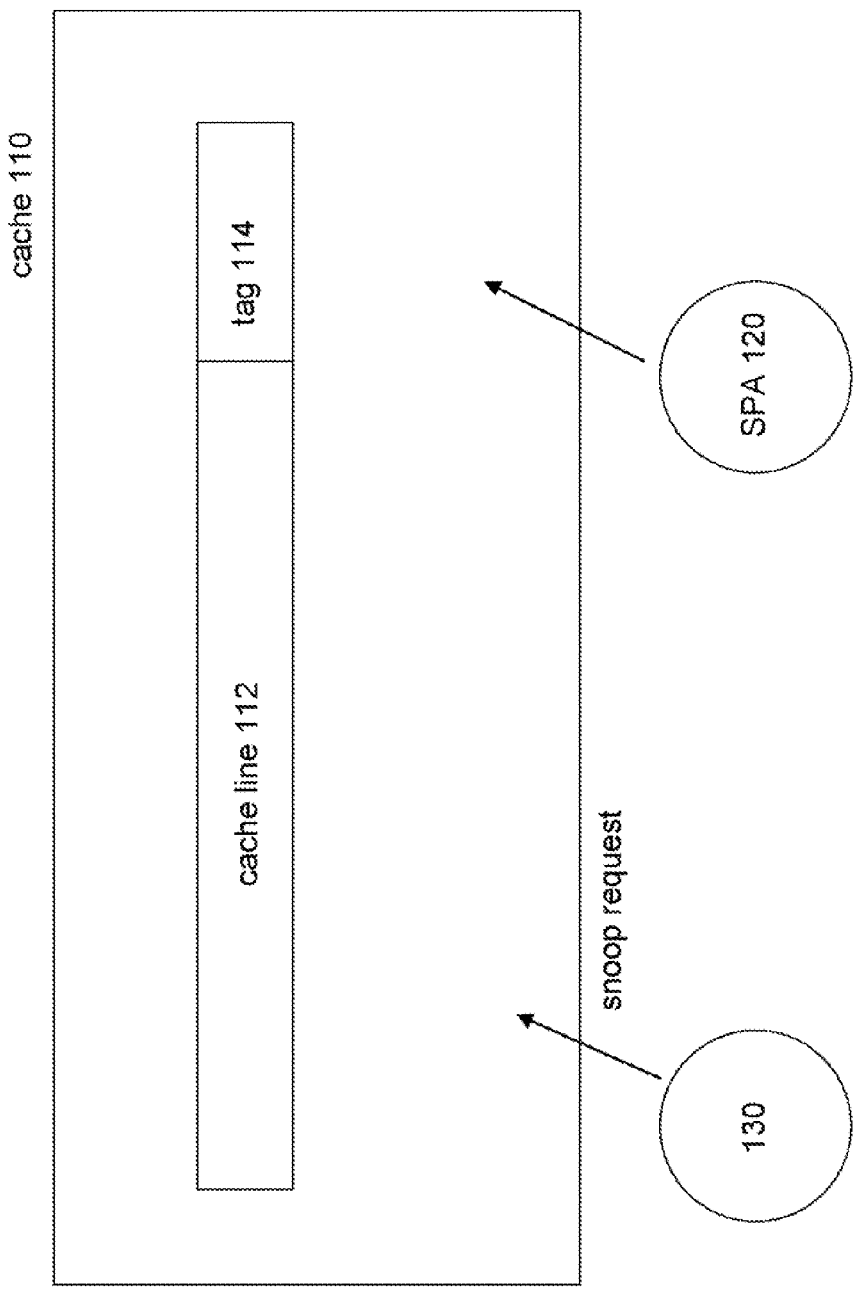
FIG. 1 is a block diagram of an apparatus for protecting private data from cache attacks according to an embodiment of the present invention.

Embodiments of the present invention comprise a mechanism and a method that enable a processor to handle secret/private information white preventing, at the hardware level, malicious applications from accessing this information. This mechanism can be used by any application, where some typical examples are Digital Rights Management (DRM) applications, disk encryption applications, networking applications and any other application that needs to handle and manipulate cryptographic keys or private data without the concern of being observed by other programs.

Embodiments of the present invention may be used to mitigate side channel attacks. Cache-based side channel attacks have recently become a concern for applications that perform cryptographic operations. Such attacks are launched by a spy process that fills the cache using some chosen pattern, context switches, and upon return experiences cache evictions that are due to the operations of the victim application. The spy process extracts information from the cache eviction patterns it experiences. Side channel attacks are also possible when two applications share the same cache in CMP or SMT topology.

Reference in the specification to "one embodiments" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In one embodiment, a Protected Cache (e.g., cache 110 in FIG. 1) may be used as a building block to enhance the security of applications trying to create, manage and protect secure data. A Protected Cache is an extension of the standard cache that has the following properties.

A Protected Cache can hold data which is non-coherent and private to the caching agent only. Data written to the Protected Cache is private to the hardware thread that wrote it. The Protected Cache is, in a sense, a big private scratchpad intended for the use of the processor to generate intermediate results. Since the data in the Protected Cache is non-coherent and resides in a private memory spaces it cannot be snooped by another caching agent or by a simultaneous multi-threading (SMT) thread sharing the same cache.

There is a mechanism to inform the processor of any event where one of the lines tagged as private is chosen as victim for eviction, and being evicted.

In order to prevent tagged data from being chosen as victim for eviction, the least recently used (LRU) mechanism is set to favor tagged lines.

A mechanism for flushing all private data in the Protected Cache may be used. This mechanism may be used by the application to erase private data after the calculations are done.

A mechanism to flush the Protected Cache on a ring transition may also be used. This mechanism ensures that data which is private to one application will not be visible to another application sharing the same cache after a context switch.

The proposed usage model of the Protected Cache can be described as the following Secure Programming Paradigm.

To protect its sensitive memory space, a Security and Privacy Aware (SPA) application (e.g., 120 in FIG. 1) can use tagged stores and loads in order to handle its private data (e.g., 220 in FIG. 2).

The Protected Cache has performance implications for the computer system. The throughput and latency of accessing the Protected Cache is the same as of the L1 data cache. However, the Protected Cache differs from regular caches in other respects. With regular caches, a modified line that is evicted can be later read from higher level of caches or from main memory. In contrast, data tagged as private cannot be recovered after eviction. Since evicted data needs to be re-generated, the use of the Protected Cache carries obvious performance implications. Consequently, only applications that need private storage which is invisible to any other application would find it useful to use the Protected Cache capabilities.

In addition, all data tagged as private, cannot be live-out of the program since the memory space that the Protected Cache uses is non-coherent. The Protected Cache can only be used for intermediate calculations.

The Protected Cache may be accessed by introducing two new instructions. One new instruction enables reading from private storage and the other new instructions enables writing to private storage. All required calculations may be performed by reading the private data to a register carrying out the required calculations, and writing the data back to Protected Cache. That is, applications that use Protected Cache would view the processor behavior as a load-store machine, using register to register ALU operations.

An alternative approach is to introduce a new prefix that turns all instructions into instructions operating on the private memory space. This would allow register-memory operations.

Application of the Secure Programming Paradigm in practice may be achieved as follows. An SPA application that uses the secure programming paradigm needs to face the performance consequences of lost data caused by eviction of tagged lines. This could potentially lead to a Live Lock situation, or become a platform for launching a Denial of Service attack. A Live Lock situation could occur if tagged lines are repeatedly evicted from the cache.

If the SPA application writes some data to the Protected Cache and another core/thread accesses the same set, the tagged line can be victimized. This does not even have to be malicious; in fact, the same thread can, unintentionally, cause such eviction. Consequently, the SPA application cannot guarantee progress.

The properties of the Protected Cache can be used to mitigate live locks. In order to ensure that tagged data would not be chosen as victim for replacement, the application should only write less tagged lines per set than the number of ways per set, and use the LRU property described above. Set selection logic is globally known, and uses a subset of the bits of the address of the data, which is in the control of the application.

To completely prevent other applications from accessing the private data of an SPA application, this application can use the mechanism described above and write tagged data to a unique, private physical memory space. Combining that with the LRU property also described above will ensure private data can not be victimized or evicted due to an external snoop.

In another embodiment, a Speculative Versioning Cache (SVC) may be used to protect private data from cache attacks. An SVC is an extension of a typical cache, where the SVC cache is capable of holding data which is accessible only to the hardware thread that wrote it. With an SVC, the caching agent (e.g., the processor) is capable of performing special loads and stores, while annotating the data as private. Modified data annotated as private is invisible to other threads trying to read it (e.g., 210 in FIG. 2). A snoop request from another caching agent (e.g., agent 130 in FIG. 1) to an annotated modified line (e.g., 220 in FIG. 2) will be responded with a "Miss", and the line will be locally invalidated (e.g., 222 in FIG. 2).

All modified annotated lines can be discarded atomically using a special command (Abort), or made architecturally visible to other threads using another command (Commit).

Traditionally, Speculative Versioning Caches have been discussed in the context of memory disambiguation and Transactional Memory.

An embodiment of the present invention comprises a new usage model for a SVC, as a building block to enhance the security of applications trying to create, manage and protect some secure content/information. To this end, enhancements to the SVC may be made as follows.

An additional mechanism may be added to inform the processor of any event where another thread is trying to access its private data, or when one of the annotated lines is evicted from the cache.

In order to prevent annotated data from being chosen as victim for eviction, the LRU mechanism can be enhanced to favor annotated lines.

A mechanism that discards all modified annotated lines on Commit command may be used as well. Store operations creating such cache lines are called Ephemeral stores, and the resulting cache lines are called Ephemeral lines. Ephemeral stores are not coherent and such store missing in the cache will not generate a Read-For-Ownership request on the bus and will internally initialize the cache line with zeros.

In order to make sure that annotated lines are completely invisible to the rest of the system, the physical memory space of the cache may be extended by one additional bit. For example, if the system implements 46 bits (bit 0 to bit 45) of physical memory, annotated lines can be written to an address containing bit number 46, which will be set to 1. Since bit number 46 is private to the cache, no external snoop (from another processor or from a snoop filter) holding a physical address used by annotated store can be generated.

A mechanism to flush the SVC (using the Abort command) on a ring change may be included. This will ensure that data which is private to one application will not be visible to other application sharing the same cache after a context switch.

Use of a SVC has performance implications. Reading and writing data from a SVC does not carry any performance penalty. However, there is an important difference between regular caches and SVC. With regular caches, a modified line that is evicted can be later read from higher level of caches or from main memory. In contrast, an annotated (as private) modified line that is evicted is lost, and the data the line contained can not be recovered. Since evicted data needs to be re-generated, the use of SVC carries some performance implications. Consequently, only applications that need hardware based protection for their memory space, would find it useful to use the SVC capabilities for security.

Embodiments of the present invention include a usage model for using the SVC. To protect its sensitive memory space, an SPA application can use annotated stores to store all of its private data.

An SPA application that uses the secure programming paradigm of embodiments of the present invention needs to face the performance consequences of lost data caused by eviction of annotated lines. This could potentially lead to a Live Lock situation, or become a platform for launching a Denial of Service attack. A Live Lock situation could occur if the SPA application writes some data, and another core/thread accesses the same set and causes eviction. This does not even have to be malicious; in fact, the same thread can, unintentionally, cause such eviction. Consequently, the SPA application cannot guarantee progress.

In order to ensure that this private data would not be chosen as victim for cache eviction, the application should only write one annotated line per set in the cache, and use the LRU enhancement that favors annotated lines. Set selection logic is globally known and uses a subset of the bits of the address of the data, which is in the control of the application.

The data that the SPA application writes tentatively would be tagged as LRU, and will not be selected for eviction unless there is direct access to the particular address (which is exactly what needs to be protected by evicting and erasing the private data).

Discarding all modified annotation lines on a Commit command avoids undesired eviction coming from another thread on the same core. However, a global problem needs to be resolved for a multi core computing platform, the Snoop Filter may still choose to evict the data of the SPA application, and this policy falls beyond the control of the SVC.

If a snoop is reaching the cache line of the SPA, the processor will be informed of such snoop, and appropriate measures can be taken. For example, if the SPA application is the OS, it can de-schedule all other cores and run only the application seeking security.

To completely prevent other applications from accessing the private data of an SPA application, this application can use the extended physical memory mechanism and write the annotated data to a unique, private physical memory space. Combining that with the LRU enhancement that favors annotated lines will ensure private data cannot be victimized or evicted due to an external snoop.

An SPA application can mitigate cache attacks by using the SVC to take a whole chunk in the cache. This way, the SPA application can guarantee that any eviction would evict the whole chunk, so a spy process could not infer information from emerging patterns in cache eviction. Typically such a chunk should be built from acquiring one way per set as described above, so the annotated lines will not be victimized.

Embodiments of the present invention may provide for better protection against malicious software and increase the level of security in processor architectures. Examples of applications that may need protection against accessing their private cache, and to which the secure programming paradigm would be helpful, include the following.

A high definition digital versatile disk (HD-DVD) player receives an encrypted compressed video stream, decrypts it, and decompresses it. Temporary results need to be stored in memory. Furthermore, if the uncompressed stream needs to be re-encrypted before being sent to a display, intermediate un-encrypted results need to be stored in the cache. A malicious code that compromises this data in any of the intermediate steps, defeats the digital rights management (DRM) protection. Therefore, writing such an application under the secure programming paradigm, and running it on a processor that supports an embodiment of the present invention, increases the security level of the application.

A server that processes connections with numerous clients, exchanges keys using some public key cryptographic protocol, generates session keys for symmetric encryptions, and signs data with a secret key. It needs to protect key material and intermediate results that are moved to the cache.

An application that needs to authenticate a certain piece of data must be able to guarantee its integrity. Storing data in an "untouchable" cache can protect such data integrity.

Although the operations described herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure process, application, module, logic, and so on) as taking an action or causing a result. Such expressions are merely a shorthand way of stating the execution of the software by a processing system cause the processor to perform an action and produce a result.

What is claimed is:

1. A method to be performed by one or more processors comprising:
   a first agent storing private data in a protected cache line to protect the private data from a cache attack, wherein the protected cache line is private to the hardware thread that wrote it;
   receiving a snoop request to the protected cache line from a second agent; and
   responding to the snoop request with a miss.

2. The method of claim 1, further comprising annotating a cache line to create the protected cache line.

3. The method of claim 1, further comprising discarding the private data in response to the snoop request.

4. The method of claim 3, wherein storing the private data is by a first thread and the snoop request is by a second thread.

5. The method of claim 4, further comprising informing the first caching agent that the private data is being discarded.

6. The method of claim 5, further comprising informing the first thread that the private data is being discarded.

7. The method of claim 1, further comprising managing the cache using an eviction policy that favors the protected cache line.

8. A method comprising:
   storing private data in a protected cache line, wherein the protected cache line includes a tag to indicate that the data in the cache line is protected from a cache attack and is private to the hardware thread that wrote it;
   discarding the data because of a ring change affecting the data even though the data is valid.

9. The method of claim 8, further comprising annotating a cache line to create the protected cache line.

10. The method of claim 8, further comprising managing the cache using an eviction policy that favors the protected cache line.

11. An apparatus comprising:
- a cache including a plurality of cache lines, wherein each cache line includes a tag to indicate whether data in the cache line is protected;
- a first caching agent to store private data in a first of the plurality of cache lines and to set the tag to indicate that the cache line is protected, wherein a protected cache line is private to the hardware thread that wrote it;
- a second caching agent to issue a snoop request to the protected cache line;
- wherein the cache is to respond to the snoop request with a miss.

12. The method of claim 11, wherein the cache is also to discard the private data in response to the snoop request.

13. The method of claim 12, wherein the cache is also to inform the first caching agent that the private data is being discarded.

\* \* \* \* \*